United States Patent [19]

Ouchi et al.

[11] Patent Number: 5,036,183
[45] Date of Patent: Jul. 30, 1991

[54] CODE READING DEVICE

[75] Inventors: Junichi Ouchi; Koji Nakase; Hiroaki Sasaki, all of Furukawa, Japan

[73] Assignee: Alps Electric Co., Ltd., Tokyo, Japan

[21] Appl. No.: 348,228

[22] Filed: May 5, 1989

[30] Foreign Application Priority Data

Aug. 25, 1988 [JP] Japan .............................. 63-209535
Aug. 25, 1988 [JP] Japan .............................. 63-209536

[51] Int. Cl.⁵ .............................................. G06K 7/10
[52] U.S. Cl. .................................... 235/462; 235/463; 235/472
[58] Field of Search ..................... 235/462, 472, 463

[56] References Cited

U.S. PATENT DOCUMENTS 4,379,224  4/1983  Engstrom ............................ 235/472
4,608,487  8/1986  Awane et al. ....................... 235/383

Primary Examiner—Harold Pitts
Attorney, Agent, or Firm—Guy W. Shoup; David W. Heid

[57] ABSTRACT

There is disclosed a bar code reading device that can highly accurately read bar codes. Threshold values are established for correct identification of bar codes without being affected by blots on and unevenness of the bar code carrying surface and unstable maneuvering operations of the bar code reading device.

2 Claims, 8 Drawing Sheets

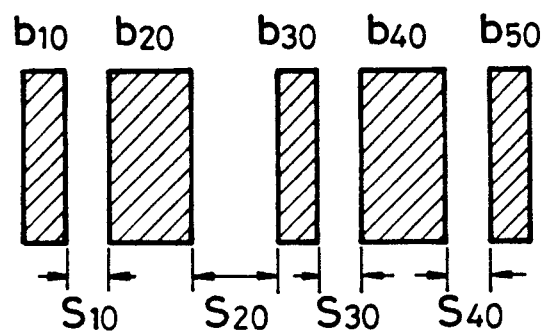
FIG.4(a)
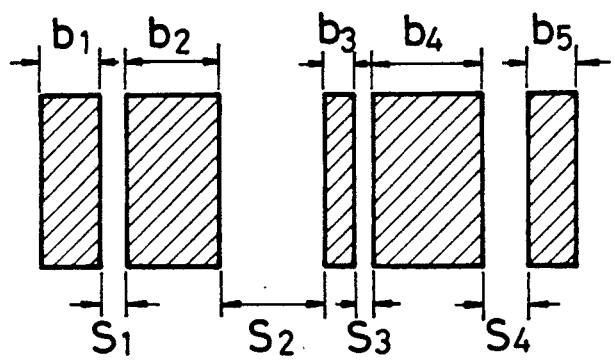
FIG.4(b)
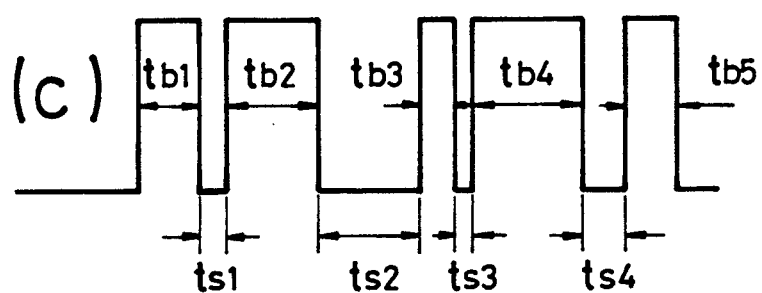
FIG.4(c)
FIG.4(d)
$b_4 > S_2 > b_2 > b_1 > b_5 > S_4 > b_3 > S_1 > S_3$ FIG.8(d)  $b_4 > S_2 > b_2 > b_1 > b_5 > S_4 > b_3 > S_1 > S_3$ FIG.8(e)  $\begin{array}{l} tb_4-ts_2, ts_2-tb_2, tb_2-tb_1, tb_1-tb_5, \\ tb_5-ts_4, ts_4-tb_3, tb_3-ts_1, ts_1-ts_3, \end{array}$ FIG.8(f)  $Th = \dfrac{tb_2 + tb_1}{2}$

CODE READING DEVICE

BACKGROUND OF THE INVENTION

This invention relates to a code reading device for reading bar codes printed on bar code carrying media such as paper and decoding them into output signals that can be processed by computers or other data processing devices and more particularly to a code reading device that can read bar codes very accurately.

PRIOR ART

Computerized bar code systems are widely used particularly in retail and distribution industries as computers can handle bar codes with ease for data processing.

While a wide variety of bar code systems are conceivable, binary level bar code systems where codes are formed by combining bars and spaces therebetween of two types with different widths are popularly used to represent numerals, letters and signs. Examples of binary level code systems include "Code 3 of 9", "Code 2 of 5" and "NW 7".

Of the binary level bar code systems, the most widely used one is "Code 3 of 9", which utilizes three sets of wide bar/wide space combinations and six sets of narrow bar/narrow space combinations to represent alphanumerals and signs such as "+" and "%".

The above mentioned conventional bar code systems are accompanied by a drawback of irregular widths of bars and spaces that can be brought forth by a variety of causes including blots of printed ink, variations in the scanning speed of the manually operated bar code reading device, variations in the distance from the printed bar codes and the bar code reading device and the uneven surface of the object where bar codes are printed.

To cope with these and other problems of varied widths of bars and spaces, it is necessary to establish thresholds values so that the bar code reading device can correctly determine wide and narrow bars and spaces and establishment of such threshold values normally requires ingeneous techniques.

A method of establishing threshold values is disclosed by Japanese Patent Publication No. 62-197877, where the average of the maximum value and the minimum value for each width category of wide and narrow bars and spaces is automatically determined for the threshold value of the width category.

However, such a method can involve errors, in which maximum and/or minimum bar and/or space widths are incorrectly determined because of stained bar code carrying surfaces and incorrect operations of code reading devices. Moreover, bar/space reading operations are highly dependent on the scanning speed, which in turn affects determination of median values for thresholds for wide and narrow bars and spaces so that consequently incorrect reading of bar codes can take place.

It is therefore the object of the present invention to provide a bar code reading device which is free from the above drawbacks of the existing methods of determining threshold values for conventional bar code reading devices and can highly accurately perform reading operations without being affected by stained bar code carrying surfaces and unstable maneuvering of the reading device.

SUMMARY OF THE INVENTION

The above object and other objects of the present invention can be achieved by providing a bar code reading device comprising a photoelectric converter for reading bar codes indicated on bar code carrying media, a counter for counting the number of time units which varies in response to the output signal level from said photoelectric converter, a start/stop determining unit for determining start or stop of a reading operation in response to the output count values from said counter, a decoder for decoding the output count values from said counter, wherein said decoder comprises a bit image converter for converting count values from said counter, said bit image converter being provided with a calculating means for calculating the average of the minimum wide bar/wide space count value and the maximum narrow bar/narrow space count value from the bar and space count values for a predetermined area of bar codes and a determining means for determining bit images of said count values.

Alternatively, the objects of the present invention can be achieved by providing a bar code reading device comprising a photoelectric converter for reading bar codes indicated on bar code carrying media, a counter for counting number of time units which varies in response to the output signal level from said photoelectric converter, a start/stop determining unit for determining start or stop of a reading operation in response to the output count values from said counter, a decoder for decoding the output count values from said counter, wherein said decoder comprises a bit image converter for converting count values from said converter, said bit image converter being provided with a calculating means for arranging the bar and space count values for a predetermined area of bar codes in descending order and calculating the average of the two successive bar and space count values whose difference offers the maximum value of all the differences and a determining means for determining bit images of said count values.

According to the invention count, the bar codes on a bar code carrying medium are read by the photoelectric converter in a bar code reading device and then the number of time units that varies in response to the output signal level from the photoelectric converter is counted by the counter.

On the other hand, start and stop of a reading operation are determined by the start/stop determining unit on the basis of the count value of the counter and the count value sent from the counter is decoded by the decoder depending on the result of the determining operation.

The bit image converter arranged in the decoder of a bar code reading device according to the present invention is provided with a calculating means and a determining means and said calculating means calculates the average of the minimum wide bar/wide space count value and the maximum narrow bar/narrow space count value from the bar and space count values for a predetermined area of bar codes, for instance the area for a specific character, and the determining means determines bit images of said count values by using the average value calculated by the calculating means as a threshold value.

Then the bit image converter outputs bit image signals representing the results of the bit image determining operation conducted by using the threshold value and the decoder performs decoding operations for the bit image signals.

BRIEF DESCRIPTION OF THE DRAWINGS

Now the present invention will be described in greater detail by referring to the accompanying drawings, in which:

FIGS. 4(a) through 4(d) illustrate operation of the embodiment of FIG. 1;

FIGS. 8(a) through 8(f) illustrate operation of the embodiment of FIG. 5.

DETAILED DESCRIPTION OF THE INVENTION

Figure 1:
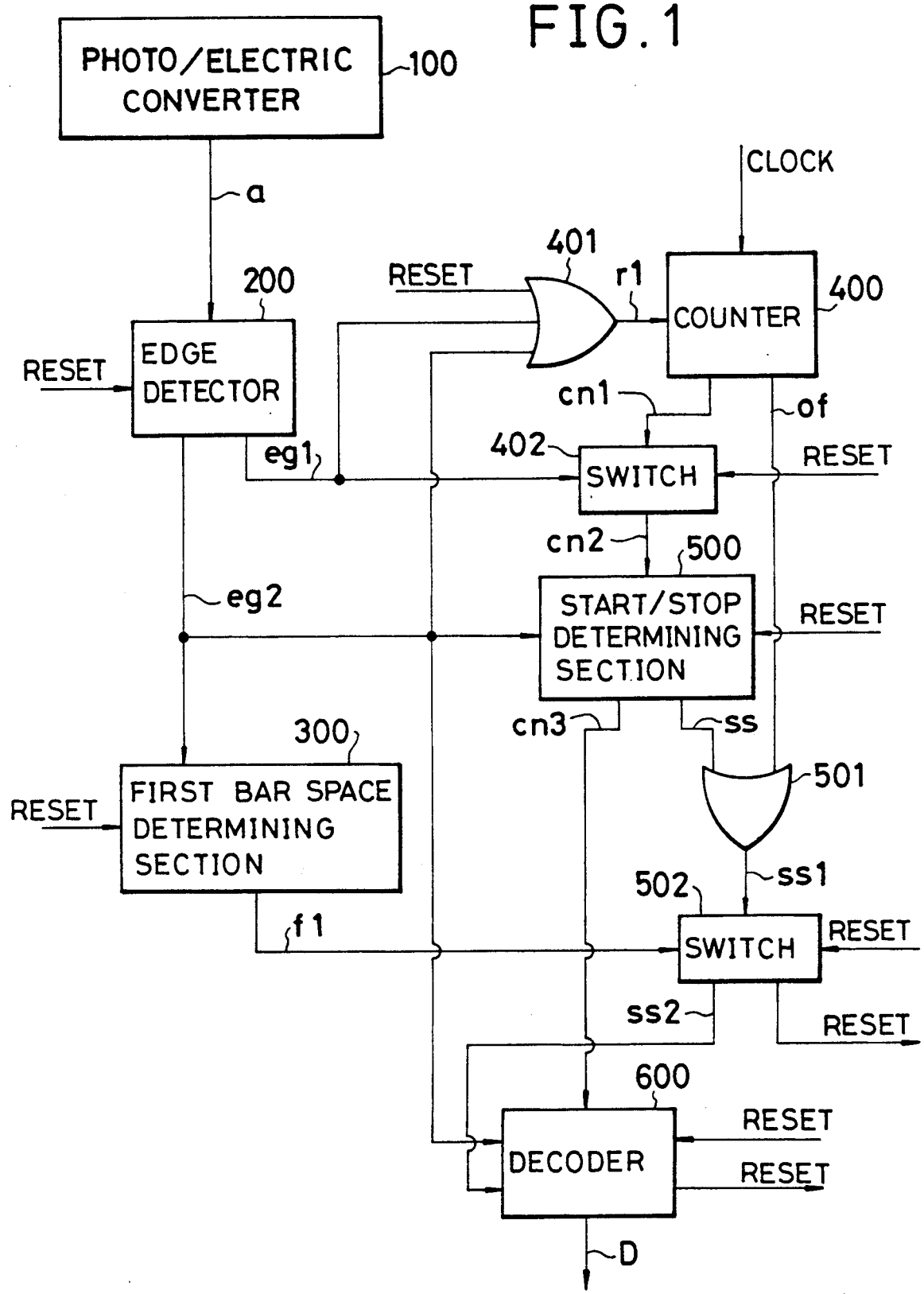
FIG. 1 is a block diagram illustrating the configuration of an embodiment of the bar code reading device according to the invention.

In FIG. 1 showing a block diagram of an embodiment of the bar code reading device according to the invention, reference numeral 100 denotes a photoelectric converter, while reference numerals 200, 300, 400, 500 and 600 respectively denote an edge detector, a first bar/space determining unit, a counter, a start/stop determining unit and a decoder. Each of reference numerals 401 and 501 denotes an OR-circuit and each of reference numerals 402 and 502 denotes a switch.

Upon reading a bar code, the photoelectric converter 100 converts it into binary coded signal "a" having a level "H" or "L" and sends it to the edge detector 200 connected with it. The OR-circuit 401, the switch 402, the start/stop determining unit 500, as well as the first bar/space determining unit 300 are connected with said edge detector 200.

The edge detector 200, upon detecting a first level change ("H"→"L" or "L"→"H") of binary coded signal "a" coming from the photoelectric converter 100 after it is reset, outputs signal "eg$_2$" to the start/stop determining unit 500, the first bar/space determining unit 300, the decoder 600 and the OR-circuit 401.

Said first bar/space determining unit 300 is connected with the switch 502 and, upon receiving signal "eg$_2$" for a predetermined number of times after it is reset, sends signal "f1" to the switch 502.

The output terminal of the counter 400, with which the output terminal of said OR-circuit 401 is connected, is connected with the switch 402 and the OR-circuit 501 and the counter 400, after it is reset by signal "r1", starts a counting operation upon receiving a clock signal and transmits signal "cn1" for the value of counting to the switch 402.

The counter 400 is so designed that, whenever it encounters an overflow condition during its counting operation, it sends signal "of" to the OR-circuit 501.

The switch 402 is connected with the start/stop determining unit 500 and set ON when it receives signal "eg$_1$" which the edge detector 200 transmits upon detecting a first edge so that the switch 402 transmits signal "cn2" to the start/stop determining unit 500 instead of signal "cn1" coming from the counter 400. When the switch 402 is reset, it is turned OFF and does not transmit signal "cn2" any further.

The start/stop determining unit 500, which is connected with the OR-circuit 501 and the decoder 600, transmits signal "cn3" for the count value between two successive edges to the decoder 600 upon receiving signal "cn2" representing the count value of the counter 400 and signal "eg$_2$" coming from the edge detector 200.

The start/stop determining unit 500 determines start of a counting operation on the basis of signal "cn2" representing the count value of the counter 400 and coming from the switch 402 and signal "eg$_2$" from the edge detector 200 and outputs signal "ss" to the OR-circuit 501 as long as the conditions for determining start of a counting operation are not met. When the conditions for determining start are satisfied, the unit proceeds to determination of stop of the counting operation and outputs signal "ss" to the OR-circuit 501 when the conditions for determining stop of a counting operation are met.

The OR-circuit 501 is connected with the switch 502, which is connected with the decoder 600. The switch 502 is turned to a first switch position when it is reset and the signal "ss1" on the output terminal of the OR-circuit 501 is transmitted as a "reset" signal.

When signal "f1" arrives from the first bar/space determining unit 300, the switch 502 is turned to a second switch position and the signal "ss1" on the output terminal of the OR-circuit 501 is given to the decoder 600 as signal "ss2".

Then the decoder 600 performs a decoding operation on the basis of signal "cn3" for the count value between two edges in the start/stop determining unit 500 and signal "ss2" from the switch 502. If the decoding operation is concluded successfully, it outputs signal "D" representing the result of the operation along with a "send" signal and a "reset" signal. On the other hand, if the decoding operation is unsuccessful, the decoder 600 outputs only a "reset" signal.

Figure 2:
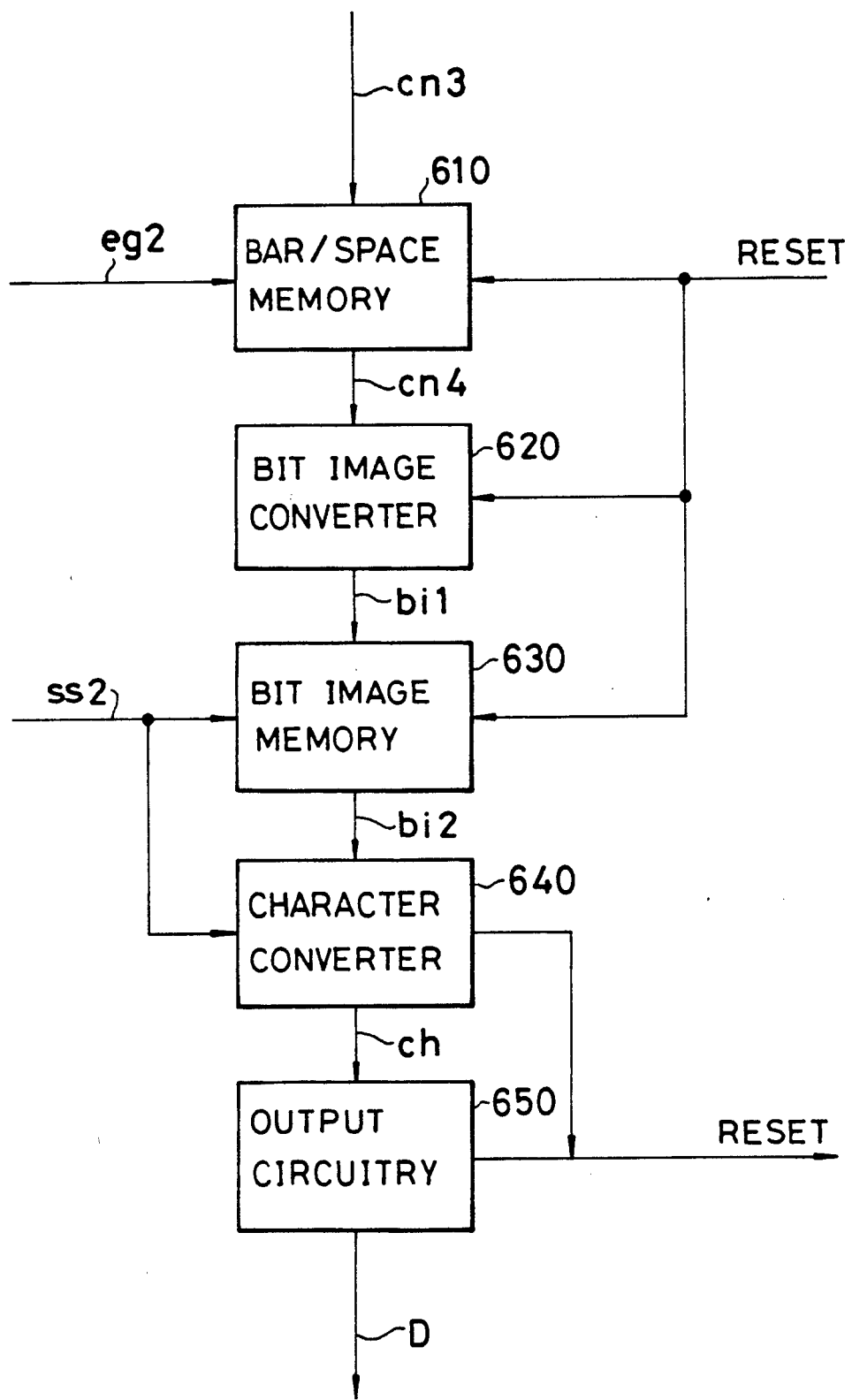
FIG. 2 is a block diagram illustrating the configuration of the decoder of the embodiment of FIG. 1.

In FIG. 2 which illustrates a block diagram of the decoder of the embodiment of FIG. 1, reference numeral 610 denotes a bar/space memory, while reference numerals 620, 630, 640 and 650 respectively denote a bit image converter, a bit image memory, a character converter and an output circuit.

The bar/space memory 610 receives signal "eg$_2$" from the edge detector 200 and signal "cn3" from the start/stop determining unit 500. The output terminal of the bar/space memory 610 is connected with the bit image converter 620.

The bar/space memory 610 takes up the signal "cn3" that represents the count value between two edges and stores the signal in it. When the stored value is read out, signal "cn4" that represents the value is sent to the bit image converter 620. When the bar/space memory 610 is reset, the stored value is cleared.

The bit image converter 620 is connected with the bit image memory 630 and signal "cn4" which represents the count value between two edges and is sent from the bar/space memory 610 is converted into a bit image and given to the bit image memory 630 as signal "bi1".

The bit image memory 630 is connected with the character converter 640. The bit image memory 630 stores the signal "bi1" sent from the bit image converter 620 and, upon receiving signal "ss2" from the switch 502, converts the stored signal "bi1" into signal "bi2" to give the latter to the character converter 640 so that the bit image memory 630 is cleared by a "reset" signal.

The character converter 640 whose output terminal is connected with the output circuit 650, upon receiving the signal "ss2" from the switch 502, converts the bit image signal "bi2" into a character and gives it to the output circuit 650 as signal "ch". If an error occurs in the character conversion operation, the character converter 640 issues a "reset" signal.

Then the output circuit 650 trims the signal "ch" that represents a character into a predetermined format and transmits signal "D" for it. When the transmission is completed, the output circuit 650 issues a "reset" signal.

Figure 3:
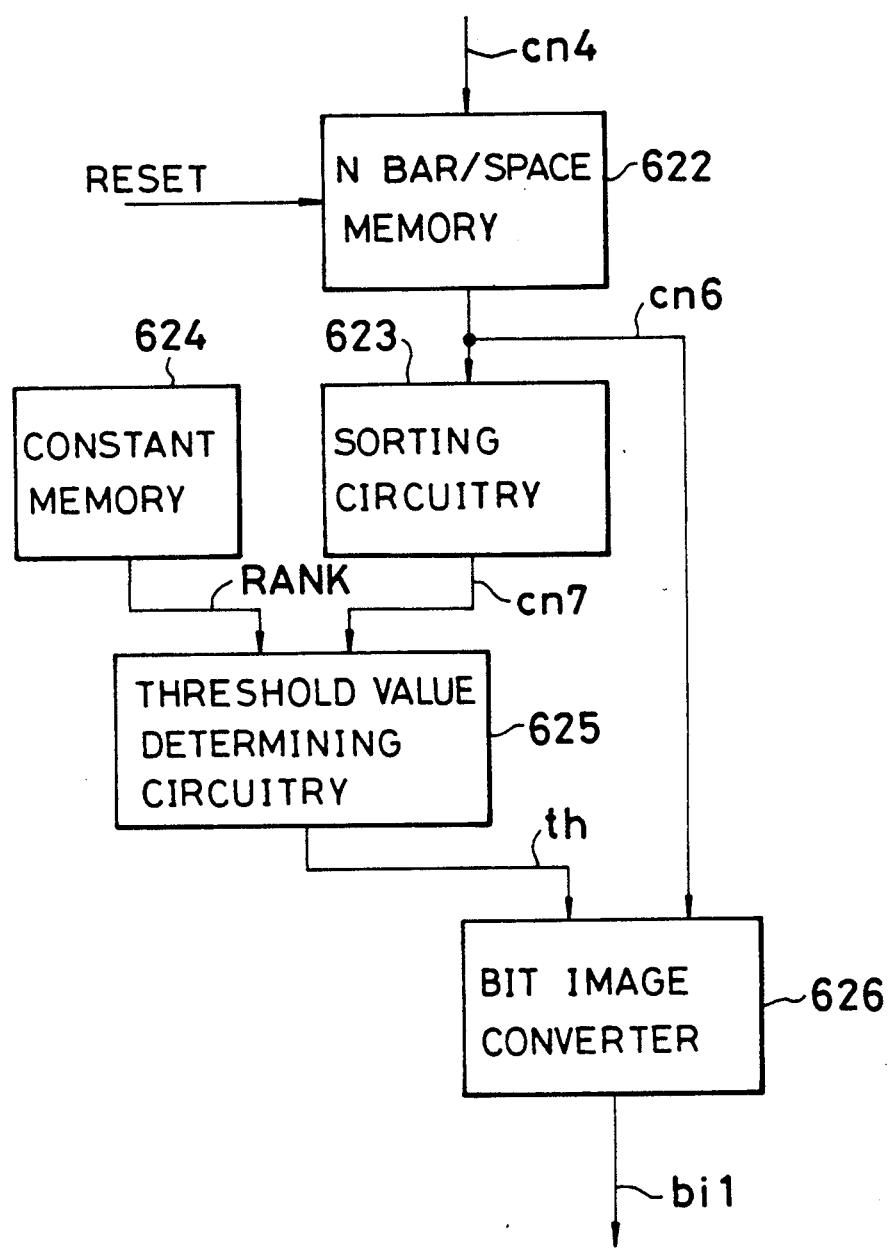
FIG. 3 is a block diagram illustrating the configuration of the bit image converter of the embodiment of FIG. 1.

In FIG. 3 which shows a block diagram of the bit image converter arranged in the decoder illustrated in FIG. 2, reference numeral 622 denotes a N bar/space memory, while reference numerals 623, 624, 625 and 626 respectively denote a sorting circuit, a constant memory, a threshold determining circuit and a bit image converting circuit.

The N bar/space memory 622 is connected with the sorting circuit 623 and the bit image converting circuit 626 and receives signal "cn4" representing the count value between two edges from the bar/space memory 610.

The N bar/space memory 622 takes up the signal "cn4" representing the count value between two edges and read from the bar/space memory 610 and stores N bar/space count values including at least one wide bar/wide space and one narrow bar/narrow space.

For example, $N=9$ for "Code 3 of 9" since number 9 corresponds to the number of character areas of the bar code system.

FIGS. 4(a) through 4(d) illustrate operation of the embodiment of FIG. 1. Assume that a pattern of the "Code 3 of 9" bar code system comprising two wide bars $b_{20}$ and $b_{40}$, three narrow bars $b_{10}$, $b_{30}$ and $b_{50}$, one wide space $s_{20}$ and three narrow spaces $s_{10}$, $s_{30}$ and $s_{40}$ is indicated on a medium as illustrated in FIG. 4(a). While the illustration shows an ideal pattern as it is free from ink blots and uneveness of the surface of medium and the scanning speed, such undesirable factors may be inevitably involved in actual reading operations and the pattern which is read by a bar code reading device may be one as shown in FIG. 4(b).

More specifically, based on the signal "cn4" that represents count values between edges and entered into the N bar/space memory 622 of FIG. 3, nine count values $tb_1$, $ts_1$, $tb_2$, $ts_2$, $tb_3$, $tb_4$, $ts_4$ and $tb_5$ are stored in the N bar/space memory 622. Then, signal "cn6" that corresponds to the count values is entered to the sorting circuit 623 and the bit image converting circuit 626.

The sorting circuit 623 is connected with an input terminal of the threshold value determining circuit 625, whose other input terminal is connected with the constant memory 624, while the output terminal of the threshold value determining circuit 625 is connected with the bit image converting circuit 626.

The sorting circuit 623 arranges the nine count values that corresponds to the signal "cn6" transmitted from the N bar/space memory 622 into descending order as shown in FIG. 4(d). Alternatively it may arrange the count values in ascending order to obtain a same effect.

The arranged nine count values are then entered to the threshold determining circuit 625 as signal "cn7".

On the other hand, the threshold determining circuit receives signal "RANK" specifying addresses Rk and $Rk+1$ respectively of the smallest wide bar/wide space and the largest narrow bar/narrow space from the constant memory 624.

The threshold determining circuit 625 calculates a threshold value Th by using the signal "RANK" sent from the constant memory 624, the signal "cn7" sent from the sorting circuit 624 and the following equation.

$$Th = \frac{(Rk{th} \text{ count value}) + (Rk + 1{th} \text{ count value})}{2 \text{ or a number close to 2}} \quad (1)$$

When the "Code 3 of 9" bar code system is used, $Rk=3$ and $Rk+1=4$ are selected from the count values arranged in descending order.

The threshold value Th as calculated above by using the equation (1) and the signal "cn6" for N (9 in this example) count values transmitted from N bar/space memory 622 are then entered into the bit image converting circuit 626. The bit image converting circuit 626 determines that the bit image is "1" when the formula (2) below is applicable and that the bit image is "0" when the formula (3) is applicable.

$$Th < \text{bar/space count value} \quad (2)$$

$$Th > \text{bar/space count value} \quad (3)$$

The signal "bi1" which is converted into a bit image according to the outcome of the determining operation is entered into the bit image memory 630 which is described earlier by referring to FIG. 2 and consequently highly accurate signal "D" which is adapted to a predetermined format to represents a character determined by a threshold value designed to eliminate the effects of blots on the bar code carrying surface and unstable meneuvering operations of the bar code reading device is sent out from the output circuit 650.

Since the average value of the smallest wide bar/wide space and the largest narrow bar/narrow space is adopted for the threshold value for determining a bit image in this embodiment, it can be effectively used to accurately define the boundary between a wide bar/wide space and a narrow bar/narrow space so that a threshold value can be set to avoid any adverse effects of blots on the bar code carrying surface and unstable maneuvering operations of the bar code reading device and consequently the bar code reading device can read bar codes with a high accuracy.

While the above embodiment is described with reference to the "Code 3 of 9" bar code system, the applicable bar code system is not limited thereto and the embodiment can be used with any other bar code systems such as "Code 2 of 5" and "NW7".

Now the present invention will be described further by referring to another embodiment illustrated in FIGS. 5 through 8(f).

Figure 5:
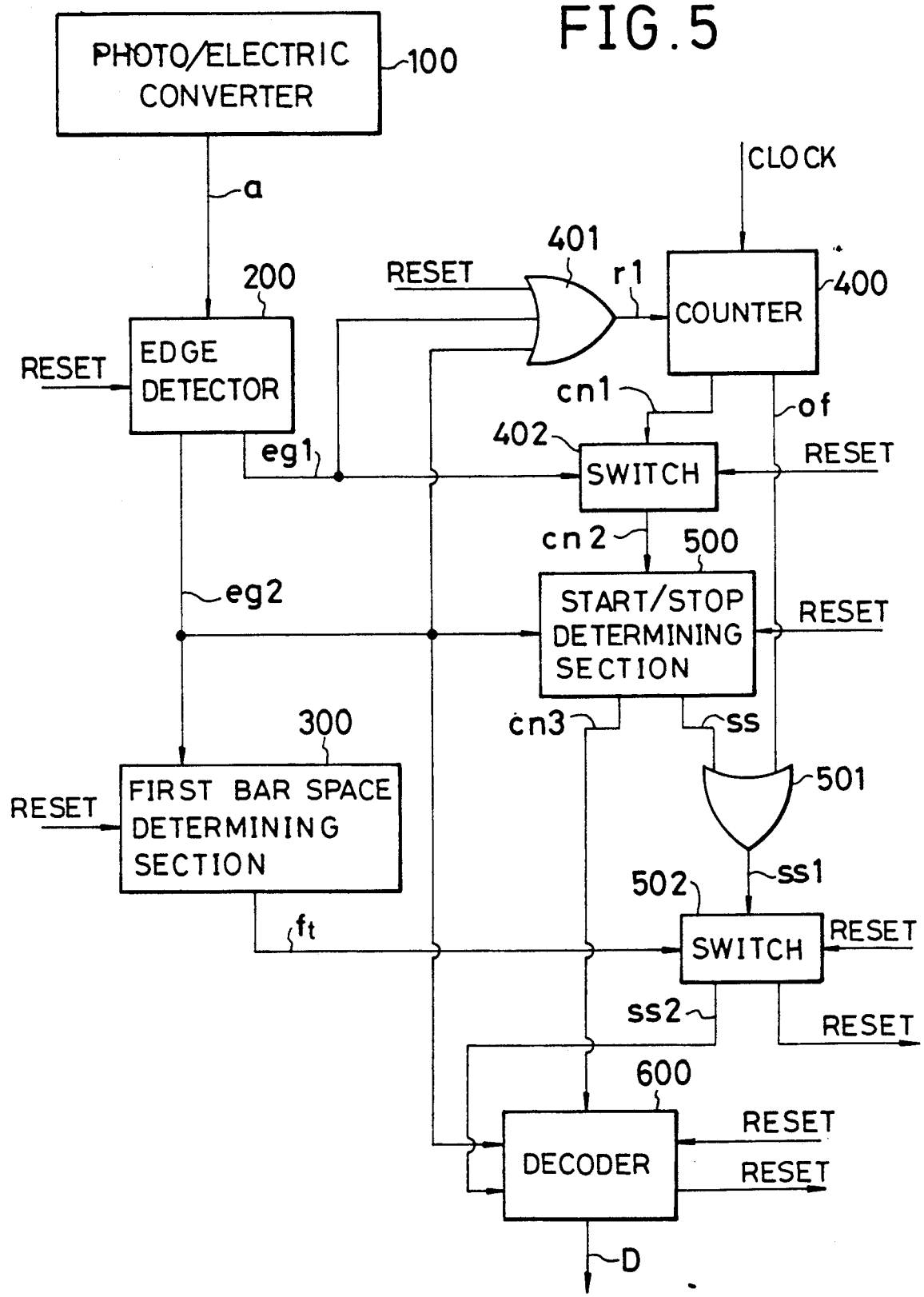
FIG. 5 is a block diagram illustrating the configuration of another embodiment of the bar code reading device according to the invention.

In FIG. 5 showing a block diagram of a second embodiment of the bar code reading according to the inventin, reference numeral 100 denotes photoelectric converter, while reference numerals 200, 300, 400, 500 and 600 respectively denote an edge detector, a first bar/space determining unit, a counter, a start/stop determining unit and a decoder. Each of reference numerals 401 and 501 denotes an OR-circuit and each of reference numerals 402 and 502 denotes a switch.

Upon reading a bar code, the photoelectric converter 100 converts it into binary coded signal "a" having a level "H" or "L" and sends it to the edge detector 200 connected with it. The OR-circuit 401, the switch 402, the start/stop determining unit 500, the decoder 600 and the first bar/space determining unit 600 as well as the first bar/space determining unit 300 are connected with said edge detector 200.

The edge detector 200, upon detecting a first level change ("H"→"L" or "L"→"H") of binary coded signal "a" coming from the photoelectric converter 100 after it is reset, outputs signal "eg$_2$" to the start/stop determining unit 500, the first bar/space determining unit 300, the decoder 600 and the OR-circuit 401.

Said first bar/space determining unit 300 is connected with the switch 502 and, upon receiving signal "eg$_2$" for a predetermined number of times after it is reset, sends signal "ft" to the switch 502.

The output terminal of the counter 400, with which the output terminal of said OR-circuit 401 is connected, is connected with the switch 402 and the OR-circuit 501 and the counter 400, after it is reset by signal "r1", starts a counting operation upon receiving a clock signal and transmits signal "cn1" for the value of counting to the switch 402.

The counter 400 is so designed that, whenever it encounters an overflow condition during its counting operation, it sends signal "of" to the OR-circuit 501.

The switch 402 is connected with the start/stop determining unit 500 and set ON when it receives signal "eg$_1$" which the edge detector 200 transmits upon detecting a first edge so that the switch 402 transmits signal "cn2" to the start/stop determining unit instead of signal "cn1" coming from the counter 400. When the switch 402 is reset, it is turned OFF and does not transmit signal "cn2" any further.

The start/stop determining unit 500, which is connected with the OR-circuit 501 and the detector 600, transmits signal "cn3" for the count value between two successive edges to the decoder 600 upon receiving signal "cn2" representing the count value of the counter 400 and signal "eg$_2$" coming from the edge detector 200.

The start/stop determining unit 500 determines start of a counting operation on the basis of signal "cn2" representing the count value of the counter 400 and coming from the switch 402 and signal "eg$_2$" from the edge detector 200 and outputs signal "ss" to the OR-circuit 501 as long as the conditions for determining start of a counting operation are not met. When the conditions for determining start are satisfied, the unit proceeds to determination of stop of the counting operation and outputs signal "ss" to the OR-circuit 501 when the conditions for determining stop of a counting operation are met.

The OR-circuit 501 is connected with the switch 502, which is connected with the decoder 600. The switch 502 is turned to a first switch position when it is reset and the signal "ss1" on the output terminal of the OR-circuit 501 is transmitted as a "reset" signal.

When signal "ft" arrives from the first bar/space determining unit 300, the switch 502 is turned to a second switch position and the signal "ss1" on the output terminal of the OR-circuit 501 is given to the decoder 600 as signal "ss2".

Then the decoder 600 performs a decoding operation on the basis of signal "cn3" for the count value between two edges in the start/stop determining unit 500 and signal "ss2" from the switch 502. If the decoding operation is concluded successfully, it outputs signal "D" representing the result of the operation along with a "send" signal and a "reset" signal. On the other hand, if the decoding operation is unsuccessful, the decoder 600 outputs only a "reset" signal.

Figure 6:
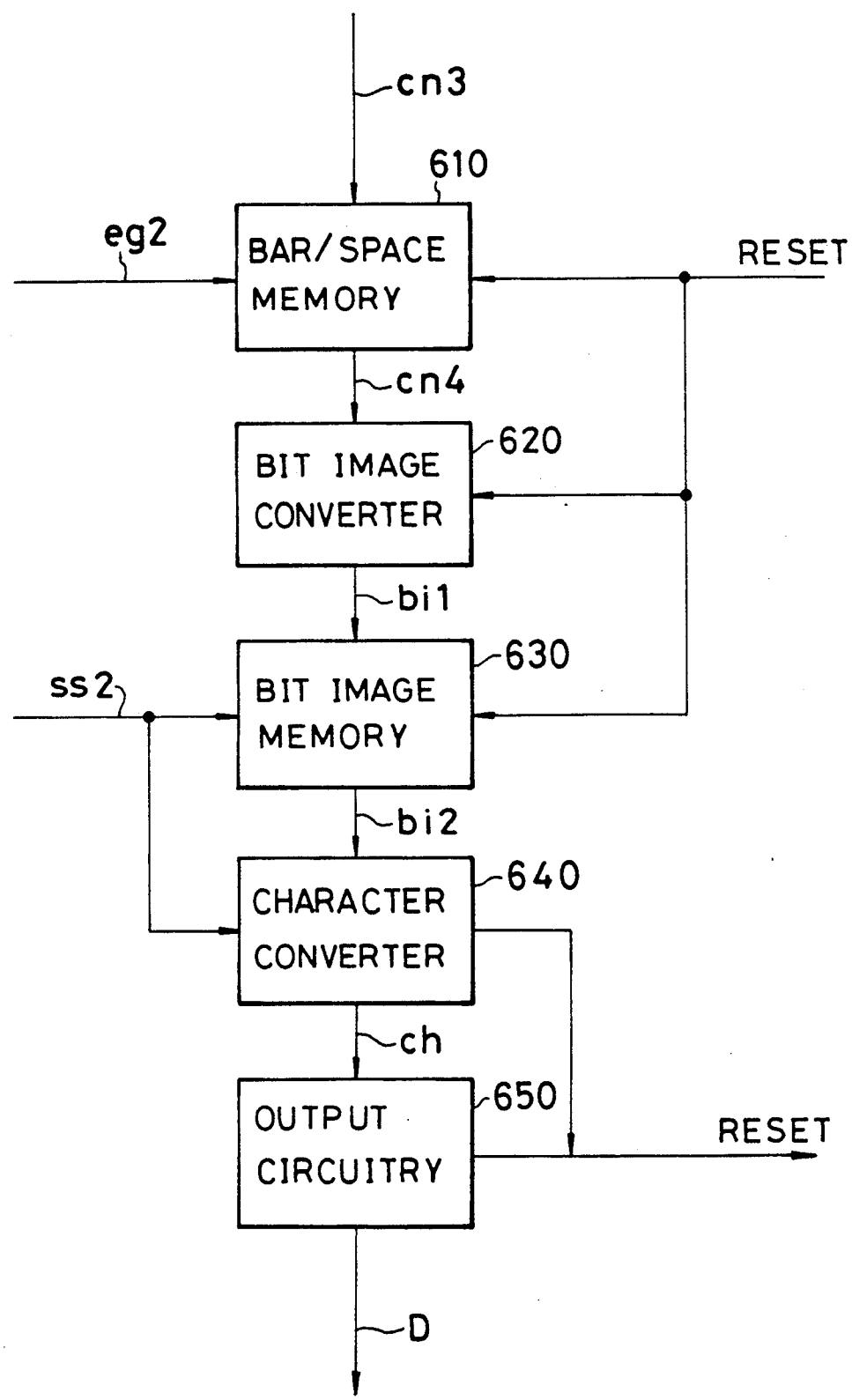
FIG. 6 is a block diagram illustrating the configuration of the decoder of the embodiment of FIG. 5.

In FIG. 6 which illustrates a block diagram of the decoder of the embodiment of FIG. 5, reference numeral 610 denotes a bar/space memory, while reference numerals 620, 630, 640 and 650 respectively denote a bit image converter, a bit image memory, a character converter and an output circuit.

The bar/space memory 610 receives signal "eg$_2$" from the edge detector 200 and signal "cn3" from the start/stop determining unit 500. The output terminal of the bar/space memory 610 is connected with the bit image converter 620.

The bar/space memory 610 takes up the signal "cn3" that represents the count value between two edges and stores the signal in it. When the stored value is read out, signal "cn4" that represents the value is sent to the bit image converter 620. When the bar/space memory 610 is reset, the stored value is cleared.

The bit image converter 620 is connected with the bit image memory 630 and signal "cn4" which represents the count value between two edges and is sent from the bar/space memory 610 is converted into a bit image and given to the bit image memory 630 as signal "bi1".

The bit image memory 630 is connected with the character converter 640. The bit image memory 630 stores the signal "bi1" sent from the bit image converter 620 and, upon receiving signal "ss2" from the switch 502, converts the stored signal "bi1" into signal "bi2" to give the latter to the character converter 640 so that the bit image memory 630 is cleared by a "reset" signal.

The character converter 640 whose output terminal is connected with the output circuit 650, upon receiving the signal "ss2" from the switch 502, converts the bit image signal "bi2" into a character and gives it to the output circuit 650 as signal "ch". If an error occurs in the character conversion operation, the character converter 640 issues a "reset" signal.

Then the output circuit 650 trims the signal "ch" that represents a character into a predetermined format and transmits signal "D" for it. When the transmission is completed, the output circuit 650 issues a "reset" signal.

Figure 7:
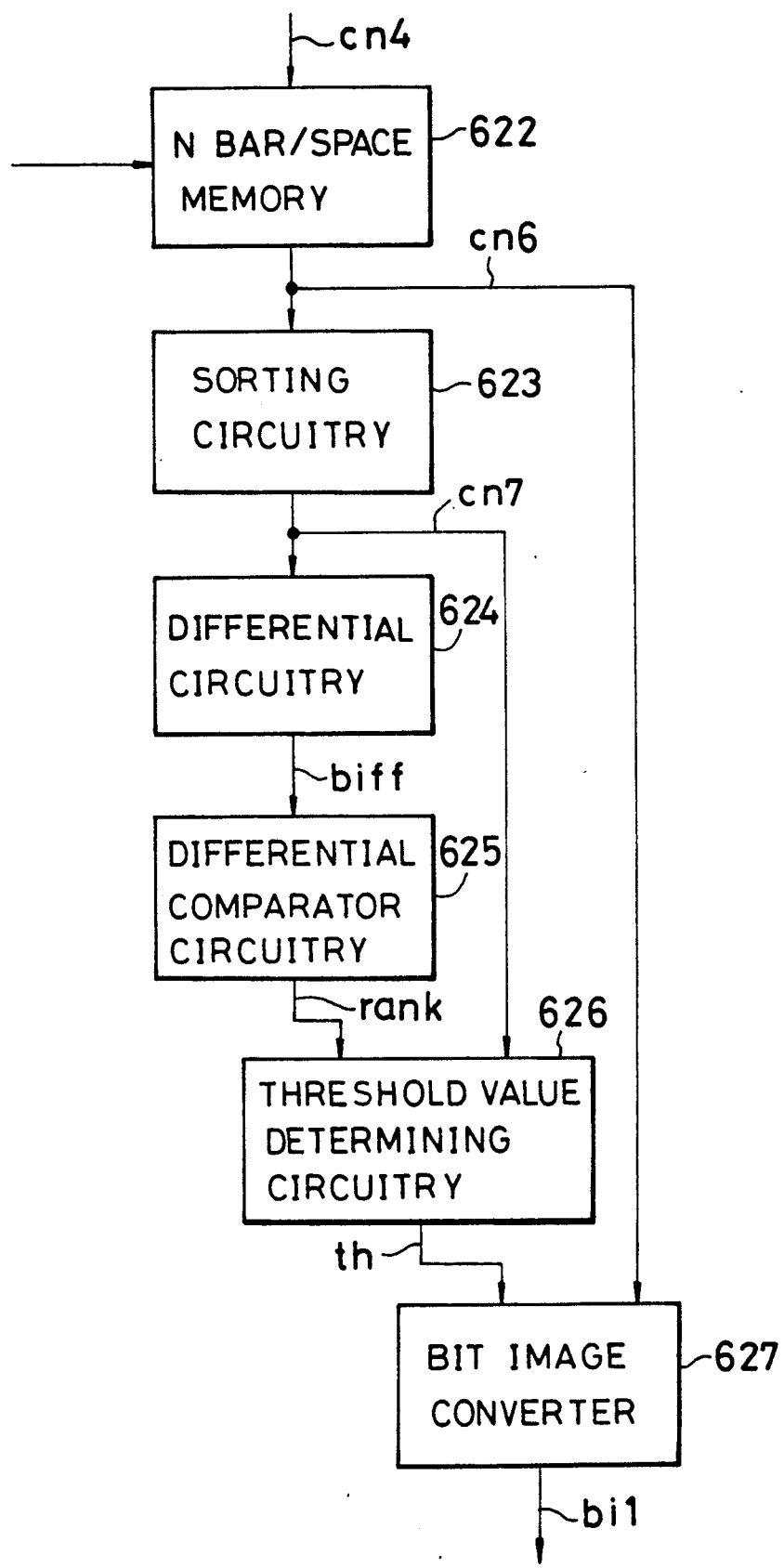
FIG. 7 is a block diagram illustrating the configuration of the bit image converter of the embodiment of FIG. 5.

In FIG. 7 which shows a block diagram of the bit image converter arranged in the decoder illustrated in FIG. 2, reference numeral 622 denotes a N bar/space memory, while reference numerals 623, 624, 625, 626 and 627 respectively denote a sorting circuit, a differential circuit, a differential comparator circuit, a threshold determining circuit and a bit image converting circuit.

The N bar/space memory 622 is connected with the sorting circuit 623 and the bit image converting circuit 627 and receives signal "cn4" representing the count value between two edges from the bar/space memory 610.

The N bar/space memory 622 takes up the signal "cn4" representing the count value between two edges and read from the bar/space memory 610 and stores N bar/space count values including at least one wide bar/wide space and one narrow bar/narrow space.

For example, N=9 for "Code 3 of 9" since number 9 corresponds to the number of character areas of the bar code system.

Figure 8A:
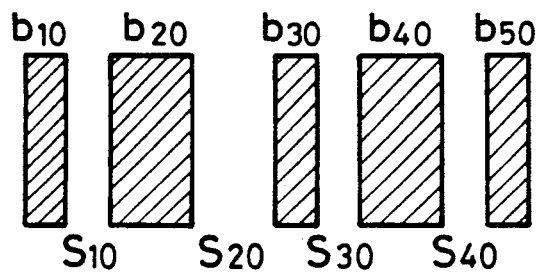
Figure 8B:
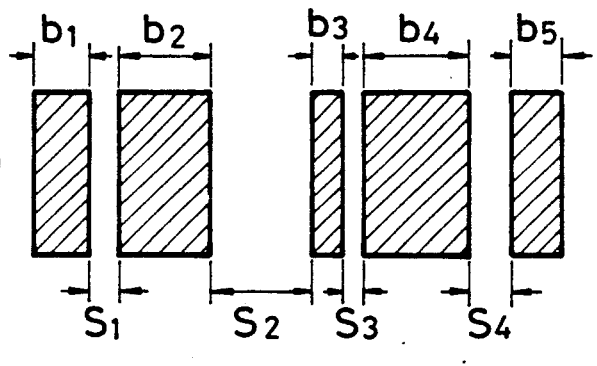

FIGS. 8(a) through 8(f) illustrate operation of the embodiment of FIG. 5. Assume that a pattern of the "Code 3 of 9" bar code system comprising two wide bars $b_{20}$ and $b_{40}$, three narrow bars $b_{10}$, $b_{30}$ and $b_{50}$, one wide space $s_{20}$ and three narrow spaces $s_{10}$, $s_{30}$ and $s_{40}$ is shown on a medium as illustrated in FIG. 8(a). It should be noted that while the illustration shows an ideal pattern as it is free from ink blots and unevenness of the surface of medium and the scanning speed, such undesirable factors may be inevitably involved in actual reading operations and the pattern which is read by a bar code reading device may be one as shown in FIG. 8(b).

Figure 8C:
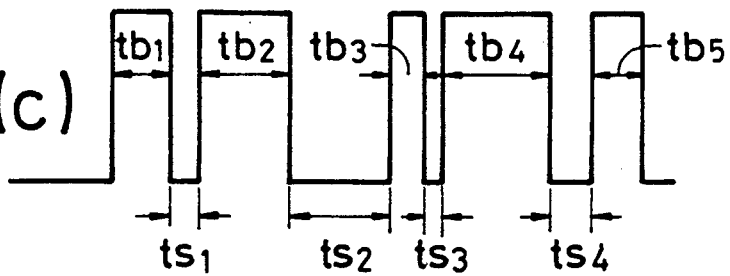

More specifically, based on the signal "cn4" that represents count values between edges and is entered into the N bar space/space memory 626 of FIG. 7, nine count values $tb_1$, $ts_1$, $tb_2$, $ts_2$, $tb_3$, $ts_3$, $tb_4$, $ts_4$ and $tb_5$ are stored in the N bar/space memory 622 as illustrated in FIG. 8(c). Then the signal "cn6" that corresponds to the count values is entered to the sorting circuit 623 and the bit image converting circuit 627.

The output terminal of the sorting circuit 623 is connected with the input terminal of the differential circuit 624 and one of the input terminals of the threshold value determining circuit 626. Besides, the differential circuit 624 is connected with the differential comparator circuit 625 and the output terminal of the differential comparator circuit 625 is connected with the other input terminal of the threshold value determining circuit 626, while the threshold value determining circuit 626 is connected with the bit image converting circuit 627.

The sorting circuit 623 arranges the nine count values that correspond to the signal "cn6" transmitted from the N bar/space memory 622 into descending order as shown in FIG. 8(d). Alternatively it may arrange the count values in ascending order to obtain a same effect. Then signal "cn7" that represents the arranged counter values is entered into the differential circuit 624 and the threshold value determining circuit 626.

The differential circuit 624 calculates the differences of two adjacent count values of the signal "cn7" and transmits N−1 differential signals "diff" to the differential comparator circuit 625.

Upon receiving the differential signals "diff", the differential comparator circuit 625 compares them and transmits signal "rank" to the threshold value determining circuit 626 to specify address Rk of the largest differential signal "diff".

The threshold value determining circuit 626 then calculates a threshold value Th by using the signal "rank" sent from the differntial comparator circuit 625, the signal "cn7" sent from the sorting circuit 623 and the following equation.

$$Th = \frac{(Rk\text{th count value}) + (Rk+1\text{th count value})}{2 \text{ or a number close to } 2} \quad (4)$$

Since $tb_2 - tb_1$ is the largest of all the differences shown in FIG. 8 in this example, $$Th = \frac{tb_2 + tb_1}{2}.$$

The threshold value Th calculated as above by using the equation (4) and the signal "cn6" for N (9 in this example) count values transmitted from N bar/space memory 622 are then entered into the bit image converting circuit 627. The bit image converting circuit 627 determines that the bit image is "1" when the formula (5) is applicable and that the bit image is "0" when the formula (6) is applicable.

$$Th < \text{bar/space count value} \quad (5)$$

$$Th > \text{bar/space count value} \quad (6)$$

The signal "bi1" which is converted into a bit image according to the outcome of the determining operation is entered into the bit image memory 630 which is described earlier by referring to FIG. 6.

By using the average of the largest differences of given two adjacent bars/spaces of those which are arranged in descending order for a threshold value, highly accurate reading operations can be conducted, eliminating any adverse effects of blots on the bar code carrying surface and unevenness of the surface and reading device maneuvering operations.

Since information on the order of a given counter value can be obtained from the related bar code by this embodiment, an automatic decoding system may also be introduced to a system comprising the embodiment.

As the average of the largest differences of given two adjacent bars/spaces of those which are arranged in descending order is used for a threshold value for determining a bit image in this embodiment, it provides a highly accurate and sensitive bar code reading device that can effectively eliminate any adverse effects of blots on the bar code carrying surface and unstable maneuvering operations of the bar code reading device.

While the above embodiment is described with reference to the "Code 3 of 9" bar code system, the applicable bar code system is not limited thereto and the embodiment can be used with any other bar code systems such as "Code 2 of 5" and "NW7".

As described above, the first embodiment of the present invention provides a bar code reading device that can highly accurately read bar codes by appropriately establishing threshold values for correctly identifying bar codes without being affected by blots on the bar code carrying surface and unstable maneuvering operations of the bar code reading device.

The second embodiment of the invention provides a bar code reading device that can highly accurately read bar codes by appropriately adapting itself to blots on the bar code carrying surface and unevenness of the surface and without being affected by unstable maneuvering operations of the device.

What is claimed is:

1. An improved code reading device for reading bar code having bars and spaces, said bars and spaces having widths and said widths being either narrow or wide, said code reading device comprising:
    means for reading said bar code and for providing time measurement signals related to the widths of the bars and spaces;
    threshold determining means coupled to said bar code reading means for receiving time measurement signals and determining a threshold value;
    means coupled to said bar code reading means for comparing said time measurements signals with said threshold value to identify wide width and narrow width bars and spaces and decoding said identified wide and narrow bars and spaces into associated characters;
    wherein said threshold value determining means comprises:

means for determining a smallest wide bar/wide space time measurement signal and a largest narrow bar/narrow space time measurement signal from a predetermined number of time measurement signals; and means for averaging said smallest wide bar/wide space time measurement signal and said largest narrow bar/narrow space time measurement signal to produce said threshold value.

2. An improved code reading device of claim 1 wherein said threshold determining means further comprises:

sorting means for arranging a predetermined number of said time measurement signals in a predetermined sequence;

means for calculating differences between adjacent sequential time measurement signals of said predetermined sequence;

means for identifying a largest difference between adjacent sequential time measurement signals; and means for determining said smallest wide bar/wide space and said largest narrow bar/narrow space by selecting said two sequential time measurement signals used to determine said largest difference, said smallest wide bar/wide space being the largest of said two sequential time measurement signals and said largest narrow bar/narrow space being the smallest of said two sequential time measurement signals.

* * * * *